Feb. 15, 1949.　　　　　N. P. DARASH　　　　　2,461,631
MACHINE TOOL
Filed Nov. 11, 1943　　　　　　　　　　　　　　6 Sheets-Sheet 3

INVENTOR.
NICHOLAS P. DARASH
BY
Kwis Hudson Boughton & Williams
ATTORNEYS

Patented Feb. 15, 1949

2,461,631

UNITED STATES PATENT OFFICE 2,461,631

MACHINE TOOL

Nicholas P. Darash, Cleveland, Ohio, assignor to
The Warner & Swasey Company, Cleveland,
Ohio, a corporation of Ohio Application November 11, 1943, Serial No. 509,841

10 Claims. (Cl. 29—49)

This invention relates to a machine tool and more particularly to the locating, locking and clamping mechanism for an indexible member of a machine tool. Although the mechanism may be advantageously employed in various types of machine tools for different indexible members thereof it will be shown and described herein by way of illustration as applied to the turret of a lathe.

An object of the invention is to provide an improved novel and efficient mechanism for locating and locking an indexible member of a machine tool in its various indexed positions.

Another object is to provide improved mechanism for clamping or binding an indexible member of a machine tool after said member has been located and locked in its various indexed positions and which mechanism can be removed from the member and then reassembled without disturbing the accurate and proper adjustment of the mechanism.

A further object is to provide in combination with an improved mechanism for locating and locking an indexible member of a machine tool in its various indexed positions, means for supplying coolant to the tools carried by the indexible member and controlled automatically by said mechanism.

A further object of the invention is to provide an improved locating and locking mechanism for an indexible member of a machine tool and which mechanism includes provision for indicating to the operator both by resistance to indexing movement and by an audible sound when said member has slightly passed its successive indexed positions, wherefore the operator will know whether said member has been indexed through one, two or more indexed positions.

Another object is to provide an improved locating and locking mechanism for an indexible member of a machine tool and which mechanism does not employ a tapered lock bolt such as has been heretofore used in connection with the indexing of indexible members.

Further and additional objects and advantages not hereinbefore referred to will be pointed out in the description which is to follow. Referring to the accompanying drawings.

Fig. 2 is an end elevational view of the turret slide and turret taken looking from the right hand side of Fig. 1.

Although the mechanism embodying the invention may be employed in various types of machine tools for locating, locking and clamping an indexible member thereof it is illustrated and described herein by way of example as applied to the turret slide and turret of a turret lathe. In this connection it should be noted that the mechanism embodying the invention could equally as well be applied to the square turret of the lathe.

Figure 1:
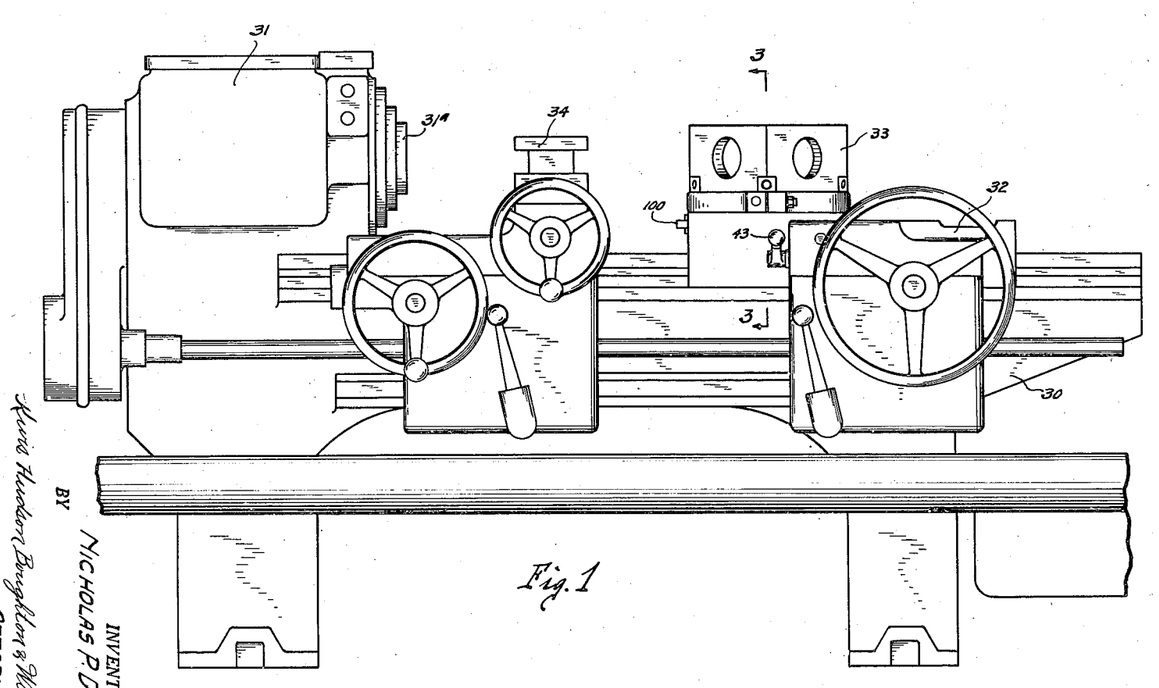
Fig. 1 is a front elevational view of a turret lathe wherein the turret slide and turret are provided with a mechanism embodying the invention.

The turret lathe shown in Fig. 1 includes a bed 30 having at one end a headstock 31 which supports the work spindle 31a. The bed 30 is provided with the usual parallel ways on which the turret slide 32 moves toward and away from the work spindle 31a. The turret slide 32 is provided in this instance with a hexagonal indexible turret 33. Intermediate the turret slide 32 and the work spindle 31a is a cross slide carriage mounted on the ways of the bed and provided with a cross slide having a square turret 34 as will be well understood in the art.

The hexagonal turret 33 is provided with a centrally located downwardly extending hollow post 35 which is rotatably mounted in a bearing opening formed in the turret slide 32. The turret 33 and post 35 are held against axial movement relative to the bearing opening by a shouldered disk 36 secured to the lower end of the post 35 in any suitable manner and by the bearing engagement of the underside of the turret with the upper side of the slide 32 as will be well understood in the art. It will thus be seen that the turret 33 is freely rotatable on the slide 32. The turret 33 is provided on its underside with an annular groove 37 concentric with the post 35 and aligning with an annular groove 38 formed in the turret slide. A ring 39 is secured in the annular groove 37 by suitable securing means such as the screws 40 and said ring extends downwardly into the annular groove 38 in the turret slide 32. Although the ring 39 has been described as separate from the turret 33 to facilitate assembly, it will be understood that said ring could be formed integral with said turret.

The ring 39 is provided in this instance with six equally and circularly spaced slots 41 which produce in the ring six equally spaced equal segmental portions 42 having abutting surfaces at their opposite ends for a purpose later to be described.

Figures 4, 5, 6:
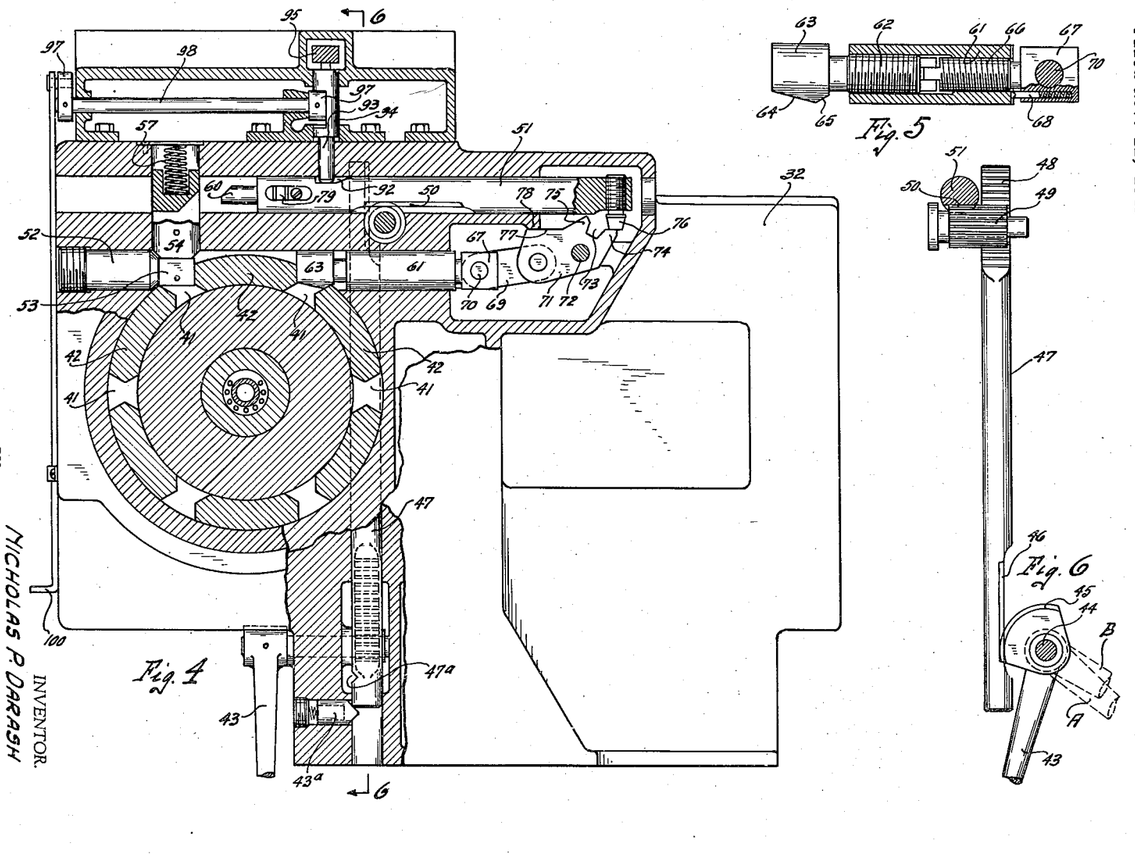
Fig. 4 is a top plan view of the turret slide and turret with certain portions broken away and shown in section.
Fig. 5 is a detached sectional view of the positioning element of the mechanism shown in Fig. 4 but on a larger scale.
Fig. 6 is a detached view of certain elements of the mechanism partly in elevation and partly in section and is taken substantially along line 6—6 of Fig. 4 looking in the direction of the arrows.

The front of the turret slide 32 is provided with a rockable control lever 43 for the mechanism embodying the invention and said lever is fixed to the outwardly extending end of a shaft 44, the inner end of which is provided with a gear segment 45, see Figs. 4 and 6. The gear segment 45 is in mesh with a rack portion 46 formed adjacent one end of a bar 47 that is slidably mounted in the turret slide and extends toward the rear of the slide. The rear end of the bar 47 is provided with a rack portion 48, the teeth of which are at right angles to the teeth of the rack portion 46. The rack portion 48 is in mesh with an elongated gear 49 mounted on a short shaft supported in the slide. The elongated gear 49 is also in mesh with a rack portion 50 formed intermediate the ends of an actuating rod 51 that is slidably supported in the slide at the rear thereof. It will be seen that when the control lever 43 is rocked downwardly or upwardly movement will be imparted to the bar 47 to cause linear movement of the actuating rod 51 in one or the other direction as the case may be. The movement of the actuating rod 51 actuates the locating, locking and clamping elements of the mechanism and effects automatic control of the coolant flow to the tools carried by the turret as will later on be explained.

The actuating rod 51 is shown in Fig. 4 in the position it occupies when the turret is located, locked and clamped and the coolant is flowing to the tool holder on the front face of the turret. At this time the rod 51 is in its most right hand position and the control lever 43 is in its full line and most elevated position as shown in Figs. 4 and 6. The spring point 43a engages behind the end of the bar 47 and holds the bar and the control lever in their located positions. At this time one of the segmental portions 42 of the ring 39 is held between the locating and locking elements which engage the abutting surfaces on the opposite ends of said segmental portion as clearly shown in Fig. 4.

The locating elements comprise a normally stationary but adjustable stop member 52, the inner end of which cooperates with a spacer block 53 that engages with the abutting surface at one end of the segmental portion 42 of the ring. The stop member 52 is threaded so as to be adjustably screwed into the opening in which it is located, suitable means being employed to lock the member in adjusted position as will be understood in the art. The spacing block 53 is connected to the lower end of a slide 54 as fully illustrated in Fig. 7. The block 53 is provided with spaced pins 55 extending into a transverse slot at the end of the slide 54 and holding the block against rocking movement relative to said slide. The opposite ends of a coil spring 56 are connected, respectively, to the block 53 and the slide 54, and said spring causes the block to move with the slide but enables the block and slide to be laterally displaced relative to each other. The slide 54 at its end opposite to the block 53 is provided with a recess into which extends a coil spring 57, the outer end of which engages a fixed plate secured to the turret slide 32, wherefore the slide 54 is constantly urged inwardly toward the ring 39.

The slide 54 is provided with a transversely extending slot 58 which adjacent its right hand end, as viewed in the drawing, is provided with a camming surface 59. The actuating rod 51 is provided at its left hand end, as viewed in the drawing, with a camming pin 60 that engages in the slot 58 of the slide 54 and cooperates with the camming surface 59 to retract the slide 54 and spacer block 53 against the action of the spring 57 as will later be explained. The locking elements (see Fig. 5) comprise a turn-buckle sleeve 61 which adjustably supports and connects a threaded rod 62 provided at its outer end with a locking head 63 having a clearance surface 64 and a stop or heel surface 65 and a threaded rod 66 provided at its outer end with a rectangular connecting portion 67. The inner ends of the rods 62 and 66 have a tongue and groove interconnection as clearly shown in Fig. 5.

From the foregoing it will be understood that the distance between the locking head 63 and the connecting portion 67 can be varied by rotating the turnbuckle sleeve 61. The right hand end of the sleeve 61, as viewed in the drawings, is serrated and the serrations thereof cooperate with a spring-pressed plunger 68 carried by the connecting portion 67 and which plunger acts to hold the turnbuckle sleeve 61 in adjusted position as will be well understood. The turnbuckle sleeve 61 and the locking head 63 have sliding movement within a bore formed in the turret slide 32 toward and away from the stop member 52. Links 69 are pivotally connected at one end to opposite sides of the connecting portion 67 by means of a pivot pin 70 and said links at their opposite ends are pivotally connected to the opposite sides of a toggle lever 71 which is in turn pivotally connected intermediate its ends to a bracket formed internally of the turret slide, as indicated at 72.

The free end of the toggle lever 71 has a gear groove 73 therein located between gear teeth 74 and 75 and said gear teeth cooperate with a conical gear tooth 76 which may be formed integral with the actuating rod 51 but which, in this instance, is in the form of a gear pin connected to said rod. The toggle lever 71 is also provided with a stop heel portion 77 which cooperates in a certain position of the toggle lever with a stop surface 78 formed internally of the turret slide. When the outer end of the gear tooth 76 is in engagement with the outer end of the gear tooth 74 of the toggle lever 71, as shown in Fig. 4, the turnbuckle sleeve 61 is projected its maximum distance toward the stop member 52 and at this time the end of the locking head 63 is in engagement with the right hand side, as viewed in the drawing, of the segmental portion 42 that has its left hand side contacting the spacer block 53 which in turn is in engagement with the stop member 52. At this time the toggle lever 71 is held against rocking movement in either direction by the engagement of the end of the gear tooth 76 with the end of the gear tooth 74 and by the engagement of the heel portion 77 with the stop surface 78. It will be seen that at this time the toggle lever 71 and the links 69 are in their most straightened relationship and that the turret 33 is held and locked against rotative movement by the engagement of the opposite ends of the segmental portion 42 of the ring 39 by the spacer block 53 and the locking head 63.

As will be explained hereinafter, movement of the actuating rod 51 from the position shown in Fig. 4 to the position shown in Fig. 11 causes the retraction of the slide 54 and spacer block 53 and the retraction of the locking head 63, thus freeing the turret for indexing movement.

Figure 12:
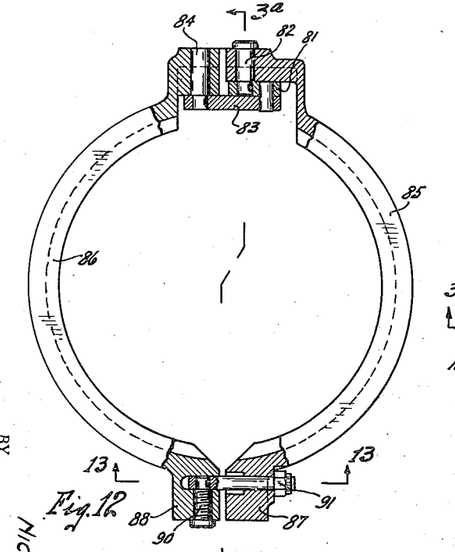
Fig. 12 is a detached view partly in top plan and partly in section of the binding or clamping means of the mechanism.
Figure 13:
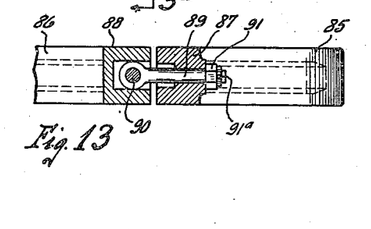
Fig. 13 is a sectional view taken substantially on line 13—13 of Fig. 12 looking in the direction of the arrows.
Figure 14:
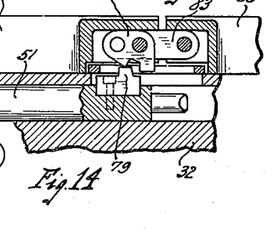
Fig. 14 (sheet 2), is a fragmentary sectional view taken approximately on line 14—14 of Fig. 3 looking in the direction of the arrows.
Figure 15:
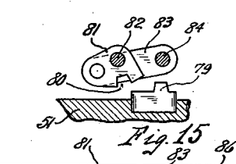
Fig. 15 (sheet 2), is a fragmentary detached sectional view showing certain of the parts illustrated in Fig. 14 but with said parts in different relationship.

The actuating rod 51 adjacent the camming pin 60 has secured thereto, in this instance, a gear tooth 79 which cooperates with the opposite sides of a gear groove 80 formed in a toggle lever 81 that is pivotally mounted on a pin 82 carried by one part of a turret binder mechanism later to be described. The free end of the toggle lever 81 is pivotally connected to one end of a toggle link 83, the opposite end of which link is pivotally connected to a pin 84 carried by the other part of the binder mechanism. The mentioned parts of the binder mechanism are in the form of segmental binder ring portions 85 and 86. The inner circumference of the ring portions 85 and 86 are formed with conical upper and lower surfaces which engage similar conical surfaces on the turret and the slide and act when said ring portions are contracted to draw the turret downwardly into tight engagement with the turret slide and to bind the turret and turret slide together. The adjacent ends of the binding ring portions 85 and 86 and to which ends the toggle lever 81 and the toggle link 83 are connected are offset radially with respect to the ring portions as indicated in Fig. 12 and as will be understood in the art. The opposite ends of the ring portions 85 and 86 are each provided with outwardly extending portions 87 and 88 which are parallel to each other and are spaced apart. The portions 87 and 88 are provided with aligned bores of different diameters and in which is located a connecting bolt 89, the inner end of which is in the form of an enlarged eye and is located in the portion 88. The portion 88 is provided with a threaded opening at right angles to the axis of the bolt 89 and in which opening there is mounted a screw 90 having a reduced inner end which engages the eye in the bolt 89. The outer or free end of the bolt 89 is provided with a nut 91 which can be properly adjusted in the assembly of the binding rings with the turret and turret slide and such adjustment need not be subsequently disturbed should it be necessary to remove the binder rings from the turret and turret slide, since as such necessity arises all that need be done is remove the screw 90 and then withdraw the binder without disturbing the adjusted position of the nut 91 on the bolt 89. The nut 91 can be locked in adjusted position by any suitable means, such as the cotter pin 91a. It will be understood that when the binder ring portions are again assembled with the turret and turret slide the bolt 89 is reinserted into the bore in the portion 88 of the ring 86 and the screw 90 again positioned to have its reduced inner end engaging in the eye at the inner end of the bolt and thus the original adjusted relationship between the ring portions and the bolt is reestablished.

It will be understood that as the actuating rod 51 is reciprocated the gear tooth 79 carried by said rod will rock the toggle lever 81 in one or the other direction to contract or lengthen the toggle formed of the lever 81 and the link 83 to open or contract the binder ring portions 85 and 86 with the bolt 89 acting as the hinging point for said ring portions, it being understood that suitable means is provided to prevent the ring portions turning about their axes as is well known in the art.

Figures 6, 21, 22:
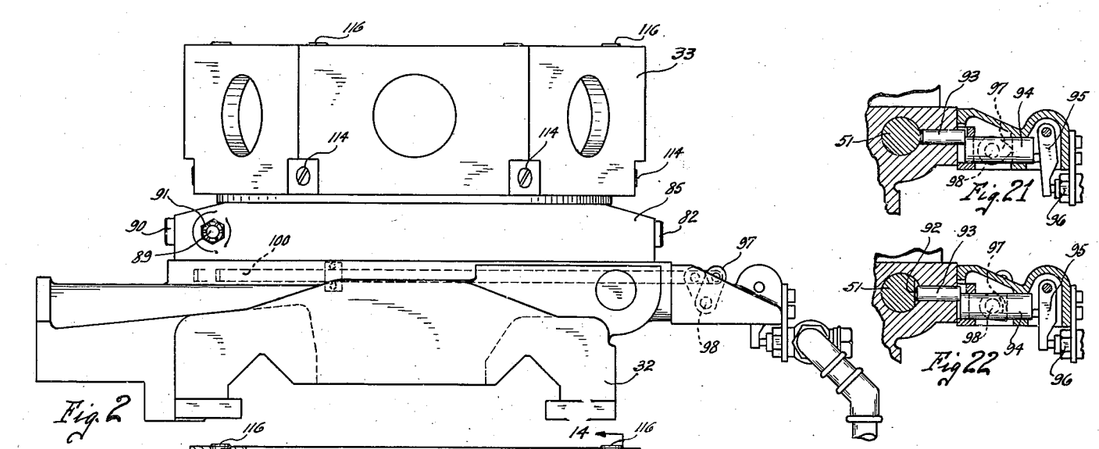
Figs. 21 and 22 (sheet 2) are sectional views taken on line 21—21 of Fig. 20 looking in the direction of the arrows with each view showing the relationship of the parts in different operative positions of the valve.

The actuating rod 51 adjacent the gear tooth 79 is provided with a recess 92 in its circumference at a point angularly displaced 90° from said gear tooth, the bottom wall of which recess has an inclined or camming portion. An actuating pin 93 is slidably supported in the turret slide 32 and one end of said pin contacts the actuating rod 51 and engages in the recess 92, see Figs. 4, 9, 21 and 22. The opposite end of said pin 93 abuts a slidable movement transmitting member 94 carried in a bracket secured to the rear of the turret slide and said member at its opposite end abuts a pin carried by a rockable lever 95 and said lever contacts at its lower end the actuating plunger of a spring actuated shut-off valve indicated at 96. When the pin 93 has its end within the deepest portion of the recess 92 then said valve is closed to the sump and the coolant flows to the tool holder carried by the front face of the turret as will later be explained. When the movement of the actuating rod 51 has caused the end of the pin 93 to contact the periphery of said rod, as illustrated in Fig. 21, then the valve is opened so that the coolant flows to the sump and does not flow to the tool holder on the front face of the turret.

It may be desirable for the operator to manually control the flow of the coolant to the cutting tools without releasing and indexing the turret as, for instance, when he desires to check the size of the work or inspect the cutting tool. In order to permit the operator to do this the movement transmitting member 94 is provided with a recess in which is located a cam 97, see Figs. 4, 21 and 22 that is fixed to one end of a rockable rod 98 mounted in the bracket secured to the rear of the turret slide. The rod 98 extends outwardly of said bracket and has fixed thereto a lever 99, the free end of which lever is pivotally connected to a slidable actuating rod 100 that extends toward the front side of the turret slide where it can be readily grasped and moved by the operator.

It will be seen that when the actuating rod 100 is pushed inwardly or toward the rear the shaft 98 and cam 97 will be rocked in a clockwise direction to move the movement transmitting member 94 away from the lever 95 to allow the latter to rock and permit the valve to close. When the operator desires to check the work or tools he pulls the rod 100 to its most forward position, whereupon the valve 96 is opened to cause the coolant to flow to the sump.

Figure 20:
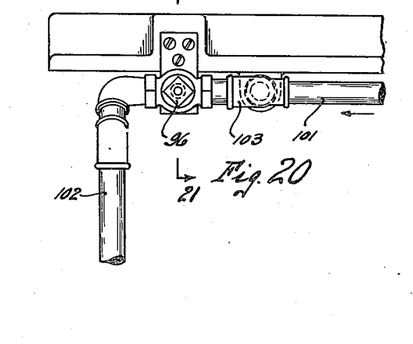
Fig. 20 is a detached fragmentary elevational view taken looking from the right of Fig. 2.

Referring to Fig. 20, the valve 96 is shown as connected on one side to a conduit 101 leading from the pump to the valve and on its other side to a conduit 102 leading from the valve to the sump. In advance of the valve the conduit 101 is provided with a T-connection 103 to which T is connected a pipe 104 that extends toward the front of the turret slide 32 and terminates adjacent the axis of the turret. The forward end of the pipe 104 is connected to a stationary coolant control member 105 which extends vertically and centrally within the post 35 of the turret. The member 105 is provided with a centrally disposed bore 106, the upper end of which is closed by a plug 107 while the lower end of said bore communicates with the pipe 104.

Figure 3:
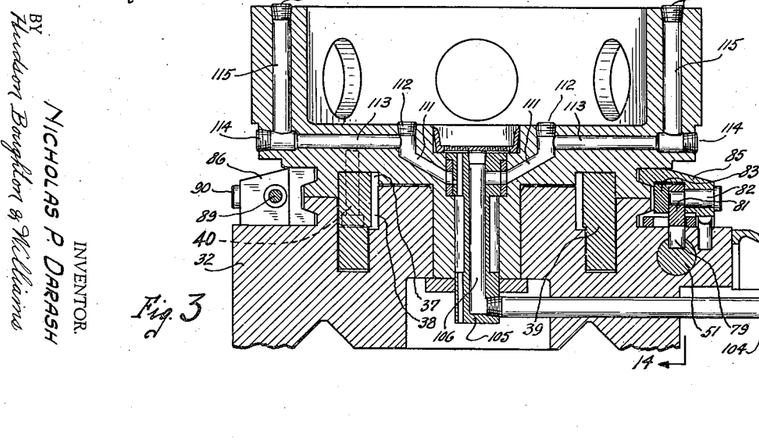
Fig. 3 is a sectional view through the turret slide and turret and is taken approximately on line 3—3 of Fig. 1 looking in the direction of the arrows, with the binding or clamping means illustrated as taken on irregular sectional line 3a—3a of Fig. 12 looking in the direction of the arrows.
Figure 18:
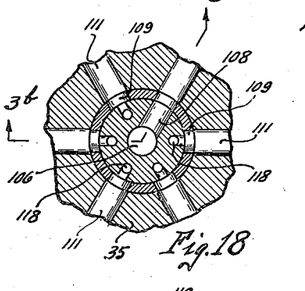
Fig. 18 is a fragmentary sectional view taken substantially on line 18—18 of Fig. 16 looking in the direction of the arrows.
Figure 19:
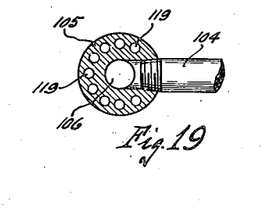
Fig. 19 is a sectional view taken substantially on line 19—19 of Fig. 16 looking in the direction of the arrows.

Referring to Fig. 3, it will be noted that the sectional view of the turret is taken along line 3b—3b of Fig. 18, while the sectional view of the turret slide is taken along line 3—3 of Fig. 1.

Figure 16:
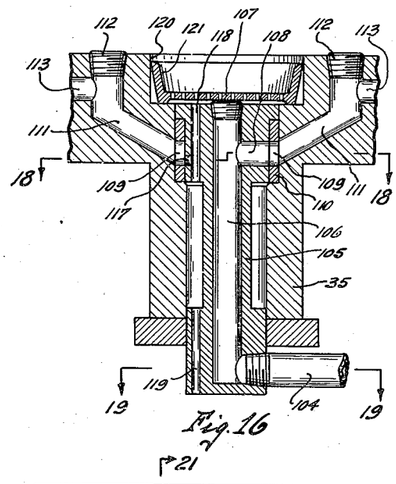
Fig. 16 (sheet 5), is a detached fragmentary sectional view on a larger scale of a portion of the construction shown in Fig. 3 and is taken substantially on irregular line 3b—3b of Fig. 18, looking in the direction of the arrows.
Figure 17:
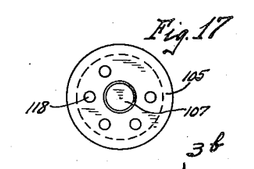
Fig. 17 is a detached top plan view of a portion of Fig. 16.

The member 105 adjacent its upper end is provided with a radially extending passage 108 that communicates with one or another of six equally spaced openings 109 formed in a ring 110 fixed in the turret. The turret 33 is provided with six equally spaced outwardly and upwardly extending passages 111, the upper ends of which are threaded to receive either plugs 112 or the threaded ends of a coupling member later to be referred to. Each of the passages 111 communicates with a radially extending passage 113 that has its outer end threaded so as to receive a plug 114 or a coupling fitting later to be referred to. Each of the passages 113 communicates adjacent its outer end with the lower end of a vertically extending passage 115, the upper end of which is threaded and may be closed by a plug 116 or receive a coupling fitting later to be referred to. Each passage 111 communicates with an opening 109 in the ring 110 and as the turret indexes to its different indexed positions the passage 108 in the member 105 is successively brought into communication with one of the openings 109 in the ring 110 and one of the passages 111 in the turret, it being remembered that the member 105 is stationary at all times. Consequently it will be seen that the passageways 111, 113 and 115 and the opening 109 in the ring 110 which are adjacent the rear corner of the front face of the turret, i. e. that one facing the spindle, are in communication with the passage 108 in the member 105 and consequently receive the coolant from the pump when the valve 96 is closed. The remaining passageways 111 and openings 109 are in communication through small drainage openings 117 with circularly spaced vertically extending passages 118 formed in the upper part of the stationary member 105 and which passages communicate at their lower ends with the annular chamber formed by said member 105 and the post 35 of the turret intermediate the ends of said member, as clearly shown in Figs. 3 and 16. The lower end of the member 105 is provided with a plurality of circularly spaced drainage passages 119 which extend through said lower end of the member and allow any coolant collected in the annular chamber to flow outwardly thereof and return to the sump. The turret 33 is provided with a centrally located recess 120 above the post 35 and a strainer member 121 is arranged in this recess and in its bottom wall is provided with a plurality of openings, wherefore coolant can pass from the member and into the passages 118 of the stationary member 105 and thence return to the sump while chips are excluded from said passages.

Figure 23:
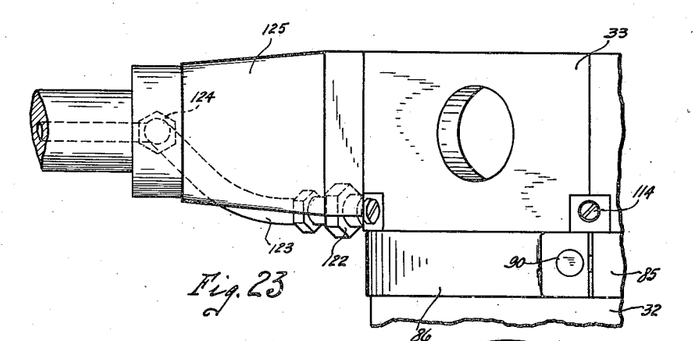
Fig. 23 is a fragmentary front elevational view of the turret and shows a tool holder attached to the front face of the turret and a coolant connection between said tool holder and the lower part of the turret adjacent the rear of the front face.

In Fig. 23 the plug 114 has been removed from the end of the passage 113 which is adjacent the lower rear corner of the front face of the turret and a coupling fitting 122 screwed into the threaded end of said passage 113. This coupling fitting is connected to one end of a hose 123, the opposite end of which is connected to a coupling fitting 124 which communicates with an opening in the tool holding member 125, wherefore coolant is free to flow from the passage 113 through the hose 123 and to the tool carried by the front face of the turret.

Figure 24:
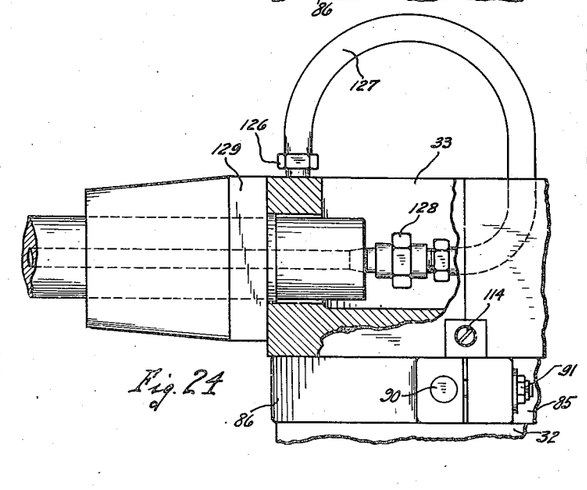
Fig. 24 is a view similar to Fig. 23 but partly in section and shows the coolant connection extending from the top of the turret at the rear of the front face of the tool holder.

In Fig. 24 the plug 116 at the upper rear corner of the front face of the turret has been removed and a coupling fitting 126 screwed into the upper end of the passage 115. This coupling fitting is connected to one end of a hose 127, the opposite end of which is connected to a coupling fitting 128 connected to the end of the tool holding member 129 within the turret, wherefore coolant can flow from the passage 115 through the hose 127 to the tool carried by the member 129.

Figure 25:
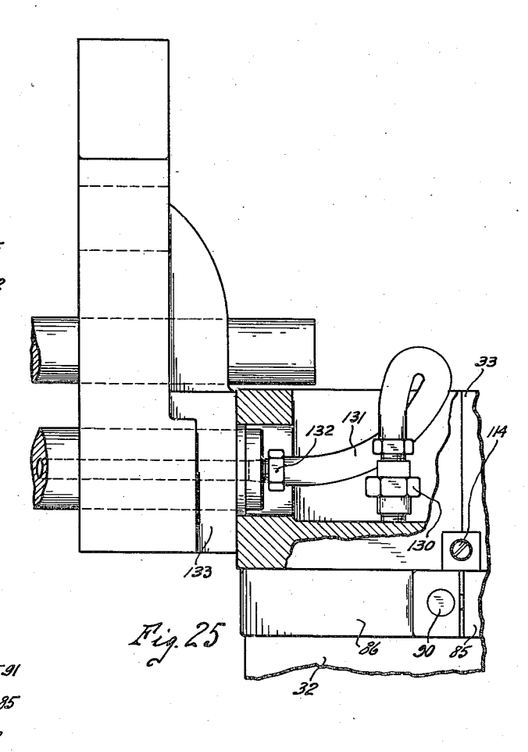
Fig. 25 is a view similar to Fig. 24 but showing the coolant connection located internally of the turret and connected to the passage which extends to the rear part of the front face of the turret and to the tool holder mounted on said front face.

In Fig. 25 the plug 112 at the upper end of the passage 111 which extends toward the rear corner of the front face of the turret and which plug is located within the turret is removed and a coupling fitting 130 connected to the upper end of said passage 111. This coupling fitting 130 is connected to one end of a hose 131 located within the turrent and having its opposite end connected to a coupling fitting 132 which is connected within the turret to the tool holding member 133, wherefore coolant will flow to the cutting tool at the front face of the turret from the passage 111 through the hose 131.

From the foregoing it will be noted that various types and kinds of tool holders can be mounted on the faces of the turret and the coolant supplied thereto in the most accessible and convenient manner by means of hoses connected either to the upper end of the passage 115, the outer end of the passage 113 or the upper end of the passage 111 as the case may be. Consequently the couplings and hoses can be positioned where they will not interfere with the tool holders on the other turret faces. The construction of the coolant supplying means is claimed per se in my divisional application Serial Number 559,738, filed October 21, 1944.

In order to more clearly bring out the function of the parts hereinbefore described a resume of the operation of the mechanism will now be set forth with particular reference to Figs. 4 and 8 to 11 inclusive. In describing the operation of the mechanism it will be understood that each time the clamping means is released and the coolant to the cutting tools stopped and the turret freed for indexing movement the turret slide will be in its rearward position wherein the cutting tools carried by the tool holders are free from the work.

In Fig. 4 the turret 33 is shown located, locked and clamped in a predetermined indexed position with the valve 96 closed to cause coolant to flow to the tool holder that is carried by the front face of the turret, it being understood that no coolant is flowing to the tool holders on the other faces of the turret at this time and any fluid in the passages to such other cutting tools is draining into the sump.

Assuming that the turret slide has moved rearwardly to free the cutting tool or tools carried by the tool holder on the front face of the turret from the work the operator rocks the control lever 43 from the full line position of Figs. 4 and 6 to the dash line position A of Fig. 6. During the first part of this movement of the control lever 43 the actuating rod 51 moves from the position shown in Fig. 4 into the position shown in Fig. 8. During this movement of the actuating rod 51 the gear tooth 79 breaks the toggle formed by the toggle lever 81 and link 83 and releases the binder. Also during this movement the pin 93 starts to move outwardly of the recess 92 and in a direction toward opening the valve 96. Also during this movement the end of the gear tooth 76 carried by the actuating rod 51 moves out of contact with the end of the gear tooth 74 of the toggle lever 71 and the side of said gear tooth 76 contacts the side of the gear tooth 75 of said toggle lever 71. The continuation of the movement of the control lever 43 from the full line position of Fig. 6 toward the dash line position A thereof continues the movement of the actuating rod 51 toward the left as indicated in Fig. 9 and until the pin 93 is riding on the circumference of the rod 51 and the valve 96 is fully opened and coolant is flowing freely to the sump. This continued movement of the control lever 43 and the actuating rod 51 causes the gear tooth 76 carried by said rod to rock partially the toggle lever 71 from the position shown in Fig. 8 into the position shown in Fig. 9, with a resultant retraction of the locking head 63. During said retraction of the locking head the inclined heel of said head being in engagement with the end of the next segmental portion 42 of the ring 39 acts to slightly rotate the turret in a clockwise or indexing direction with a resultant disengagement from the spacer block 53 of the left hand end of the segmental portion 42 that has been held between said block and the locking head. The slight rotation of the turret, as just referred to, causes the end of the segmental portion 42 that is to the left of the spacer block 53 as viewed in Fig. 4, to exert a retracting pressure on said spacer block 53 and the slide 54. Simultaneously with the exertion of this retracting pressure the locking pin 60 carried by the actuating rod 51 has engaged the camming surface 59 of the slot 58 in the slide 54 and further retracts said slide and spacer block 53 against the action of the coil spring 57.

Figures 7, 8, 9, 10, 11:
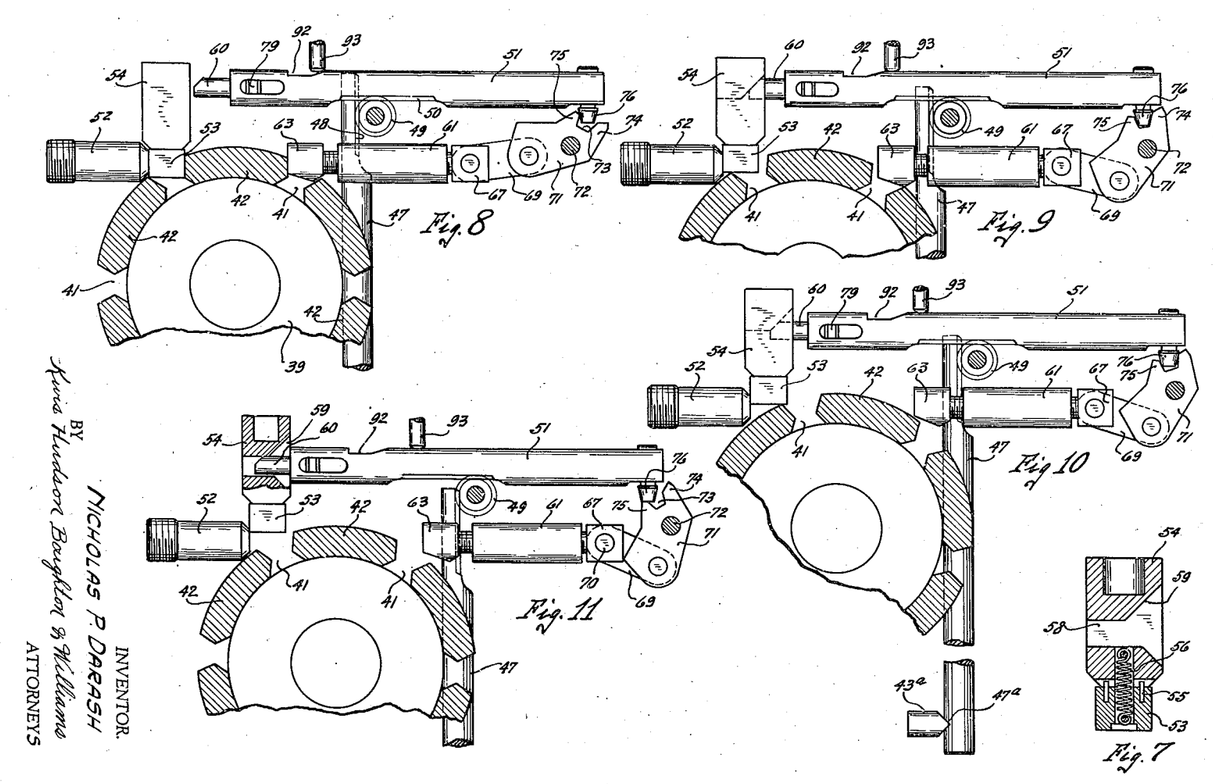
Fig. 7 is a detached sectional view of the spacing element of the mechanism shown in Fig. 4 but on a larger scale.
Figs. 8, 9, 10 and 11 are detached views of the locating and locking elements of the mechanism and show respectively the relationship between said elements in various operative positions.

The operator continues the movement of the control lever 43 until said lever is in dash line position A and at said time the parts are in the relationship shown in Fig. 10. At this time the spring point 43a will snap into the notch 47a in the bar 47, it being recalled that when the lever 43 is in the full line position of Figs. 4 and 6 said spring point 43a is behind the end of the bar 47. The engagement of the spring point 43a in the notch 47a produces a perceptible restraint to the farther movement of the control lever and the operator therefore knows by the feel that the parts of the mechanism are in the position shown in Fig. 10. At this time the toggle lever 71 has been further rocked by the continued movement toward the left of the actuating rod 51 and the locking head 63 is withdrawn to a position where it is free of the circumference of the segments 42 of the ring 39 carried by the turret, wherefore the turret can rotate in a clockwise or indexing direction without interference from the locking head 63. Also at this time the slide 54 has been nearly fully retracted but only to a position wherein the lower right hand corner of the spacer block 53, as viewed in the drawing, remains in the path of the segmental portions 42 when the turret is indexed. Consequently should the operator index the turret at this time each segmental portion 42 as it passes the spacer block 43 will farther and momentarily retract said block, with the result that as soon as said segmental portion has passed the block the latter will thereupon be slightly projected by the spring 57 into contact with the next segmental portion 42 and produce by such projection a click audible to the operator and an appreciable resistance to the indexing movement of the turret, thus indicating to him that the turret has been indexed slightly more than one segmental portion or one indexed position. This arrangement enables the operator to determine each time he has indexed the turret from one indexed position to another and if he so desires he may be counting these occurrences to index the turret any desired number of indexed positions without observing the turret position. When the parts are in the position shown in Fig. 10 and the control lever is in dash line position A the turret can only be indexed in the normal or clockwise direction, since should it be attempted to rotate the turret in an anticlockwise direction the spacer block 53 will lie in the path of the end of the segmental portion 42 that is to the right of said spacer block and will act as a positive stop against back indexing or anticlockwise rotative movement of the turret.

Should the operator desire to position the operative parts of the mechanism so as to freely turn the turret in either direction he moves the control lever 43 from dash line position A to dash line position B. This movement effects a further movement toward the left, as viewed in the drawings, of the actuating rod 51, with the result that the camming pin 60 moves completely across the camming surface 59 and fully retracts the slide 54 and spacer block 53 as indicated in Fig. 11. Therefore the spacer block 53 when in this position is completely free of the circumference of the turret and does not contact with the segmental portions 42 when the turret is rotated in either direction. This further movement of the actuating rod 51 causes the gear tooth 76 carried by said rod to move from the position shown in Fig. 10 to the position shown in Fig. 11 and to further rock the toggle lever 71 and retract the locking head 63 to a position completely clear of the circumference of the turret. When in this position the end of the gear tooth 76 engages the end of the gear tooth 75 of the toggle lever 71 and holds said toggle lever and the locking head 63 in the position to which they have been moved.

The advantage residing in being able to index the turret in either direction is that should a particular job call for the use of only a few tools on the turret as, for instance, the use of two tools occupying only two adjacent faces of the turret, the operator can readily index the turret from one tool to the other without indexing the same completely around.

When the operator desires to locate, lock and clamp the turret in its indexed position he moves the control lever, if it is not already there, to dash line position A of Fig. 6 and rotates the turret in a clockwise direction until he hears or feels the engagement of the spacer block 53 with the segmental portion 42 that is following the segmental portion 42 which is to be held between the spacer block and the locking head 63. This condition is illustrated in Fig. 10 and it will be noted that at this time the segmental portion 42 which is to be engaged by the block 53 and head 63 has its circumference contacting the inclined side of said head, wherefore the operator by rotating the turret slightly in the anticlockwise direction brings the segmental portion 42 which is to be held between the block 53 and head 63 into the position shown in Fig. 9, at which time the heel of the inclined side of the locking head 63 is contacting the end of the preceding segmental portion and said heel will act to cam the said portion downwardly and rotate the turret slightly in a clockwise direction if the turret has been moved too far in the anticlockwise direction. At this time the straight end of the locking head 63 is in a position wherein it can engage the right hand end of the segmental portion 42 in question when said head is projected toward the left during the movement of the control lever 43 from dash line position A to the full line position of Fig. 6. Such movement of the control lever will cause the actuating rod 51 to move toward the right and the first part of such movement of the actuating rod rocks the toggle lever 71 from the position shown in Fig. 10 to the position shown shown in Fig. 9 through the engagement of the gear tooth 76 with the teeth of said toggle lever. This results in the locking head 63 being projected farther toward the left as viewed in the drawing and also allows the slide 54 and spacer block 53 to be partially projected by the spring 57. The continued movement of the actuating rod 51 toward the right from the position shown in Fig. 9 to the position shown in Fig. 8 further rocks the toggle link 71 and still farther projects toward the left the locking head 63, with the result that said head engages the right hand end of the segmental portion 42 and exerts pressure thereon to rotate the turret in an anticlockwise direction until the left hand end of said segmental portion contacts the right hand side of the spacer block 53 which during this movement of the actuating rod has been further projected into slot 41. The further projection of the spacer block 53, as just referred to, also functions with the locking head 63 to slightly rotate the turret in said anticlockwise direction to thus accurately locate the turret in indexed position with the opposite ends of the segmental portion 42 firmly held between the locking head 63 and the spacer block 53 as indicated in Fig. 8.

When the control lever 43 has reached the full line position the tooth 76 carried by the actuating rod 51 is contacting the end of the tooth 74 of the toggle lever 71, as indicated in Fig. 4, and also at this time the flat surface 77 of said toggle lever is contacting the surface 78 internally of the turret slide, with the result that said toggle lever 71 is straightened and locked against rocking movement so long as the said rod remains in its most right hand position. Just prior to the rod 51 reaching its most right hand position the end of the pin 93 contacts the deepest portion of the recess 92 and allows the valve 96 to close under the action of its valve spring, wherefore the coolant starts flowing through the pipe 104 and to the tool holder carried by the new front face of the turret. At this time the passages which communicate with the tool holders on the other faces of the turret are not in communication with the pipe 104. The coolant in the tool holder which functioned in the last operative step and in the hose connection thereto will now drain through the openings 117 and the passages 118 and 119 previously described to the sump in the base of the machine.

It will be understood that during the indexing movement of the turret no coolant will be thrown outwardly by centrifugal force, since the valve 96 is open at such time and the coolant is flowing freely from the pump to the sump and is not flowing to the turret, while the coolant from the tools and tool holders previously used is draining back to the sump.

The final part of the movement of the actuating rod 51 to its most right hand position causes the gear tooth 79 carried by said rod to engage with the gear tooth groove 80 of the toggle lever 81 and straighten the toggle formed by said lever and the link 83, with the result that the binding ring portions 85 and 86 are contracted into tight clamping engagement with the turret and the turret slide.

When the turret has been indexed, located, locked and clamped in its new position by the completion of the movement of the control lever 43 to the full line position as indicated in Fig. 4, the spring point 43a engages behind the end of the bar 47, wherefore undesired movement of the bar 47 is prevented. The operator can now cause the turret slide to move forwardly to bring the tool on the front face of the turret into machining engagement with the work. If the operator should desire during this particular operative step to check the diameter of the work before the step is completed he can either stop the movement of the turret slide or move the same slightly rearwardly to free the tool from the work and then pull the rod 100 outwardly to open the valve 96 and stop the flow of coolant to the cutting tool on the front face of the turret. Thereupon he can gauge the diameter of the work without interference from flowing coolant, and when he is ready to resume the machining operation he simply pushes the rod 100 inwardly to its former position and thus effects closing of the valve 96, which results in the coolant again flowing over the cutting tool on the front face of the turret.

From the foregoing description of the construction and the mode of operation of the mechanism embodying the invention it will have been seen that an improved, novel and efficient mechanism is provided for locating and locking an indexible member of a machine tool in its various indexed positions. In addition it will have been noted that the improved mechanism provides an efficient arrangement for clamping or binding the indexible member after it has been located and locked in its various indexed positions. Furthermore, the mechanism has been pointed out as including a novel arrangement whereby the supplying of coolant to the tool holder carried by the front face of the indexible member is automatically controlled by the act of indexing, locating and locking said member in its various indexed positions while the coolant is draining from the other tool holders. Additionally, the mechanism has been shown to include provision for indicating to the operator by a noticeable resistance to the movement of the turret and by an audible sound when said member reaches its approximate successive indexed positions, wherefore the operator will know whether said member has been indexed through one, two or more indexed positions without observing the position of the member. It should also be observed that the mechanism does not employ the usual tapered lock bolt, such as has been heretofore used in connection with the locking of indexible members of a machine tool.

In addition to the broader advantages hereinbefore referred to it should be noted that the stop member 52 is adjustable and also that the distance between the inner end of said stop member and the free end of the locking head 63 can be varied by rotating the turnbuckle sleeve 61. Due to this arrangement it is possible to assemble the parts in approximate adjusted position and then to accurately locate by simple adjustment the turret with its front face perpendicular to the axis of the work spindle. These adjustments are made when the turret and the mechanism embodying the invention are first assembled and can also be performed subsequently in case of wear between the parts of the locating and locking means of the mechanism. In an indexing mechanism employing the usual lock bolt it is not possible to assemble the parts approximately and then adjust the parts to accurate position or to compensate for wear therebetween and to bring the front face of the turret into its proper perpendicular relationship to the axis of the work spindle. This is due to the fact that the usual lock bolt is slidable in the base in fixed bearings while the lock bolt bushings are fixed in the underside of the turret.

Although a preferred embodiment of the invention has been illustrated and described herein it should be understood that the invention is susceptible of various modifications and adaptations within the scope of the appended claims.

Having thus described my invention, I claim:

1. In a machine tool, an indexible member provided with spaced abutment portions, a movable locking element adapted to cooperate with one end of an abutment portion in each indexed position of said member, locating means including a locating stop in alignment with said locking element, and a locating element cooperating with said stop and the opposite end of said abutment portion in each indexed position of said member and movable transversely to the path of movement of said locking element, and actuating means for said locking and locating elements.

2. In a machine tool, a support, an indexible member on said support and provided with spaced abutment portions, a locating element and a movable locking element adapted to cooperate with an abutment portion in each indexed position of said member, actuating means for said locking element carried by said support, operative connections between said locking element and said actuating means and including a link and lever forming a toggle, and means for locking said locking element in operative position when said toggle is straightened and including a stop surface on said support and a locking surface portion on said actuating means both of which surfaces contact spaced surfaces on said lever.

3. In a machine tool, an indexible member provided with spaced abutment portions, a locating stop, a movable locking element, a movable spacing element, said elements being adapted to cooperate with opposite ends of an abutment portion in each indexed position of said member and said stop being adapted to cooperate with said spacing element, and means for varying the distance between said stop and said locking element when cooperating with said spacing element and said abutment portion whereby the indexed position of said indexible member can be accurately located.

4. In a machine tool, a support, an indexible member on said support and provided with spaced abutment portions, a locating stop, a movable locking element, a spacing element, said elements being adapted to cooperate in each indexed position of said member with an abutment portion and said stop being adapted to cooperate with said spacing element, said locking element including oppositely threaded members movable axially relative to each other and having interengaging tongue and groove portions on their adjacent ends, and a sleeve surrounding said members and having threaded engagement therewith wherefore rotation of said sleeve moves said members toward or away from each other, and means cooperating with said sleeve to hold the same in adjusted position.

5. In a machine tool, a support, an indexible member thereon and provided with spaced abutment portions, locating means and locking means carried by said support and adapted to cooperate with an abutment in each indexed position of said member, said locating means including an adjustable stop, a slide movable transversely of said stop and having on its end adjacent said stop a laterally movable spacer block adapted to engage said stop and said abutment portion.

6. In a machine tool, a support, an indexible member thereon and provided with spaced abutment portions, locating means including a locating stop and a spacer block movable transversely of said stop, locking means including a locking head having a heel portion, a common actuating means for said spacer block and said locking means, and means for holding said actuating means in one position wherein said spacer block and said locking head cooperate with an abutment portion to hold the member in indexed position, said last means also cooperating with a portion of said actuating means to hold the latter in another position wherein said spacer block lies in the path of the periphery of said abutment portions, wherefore said block will be moved by said portions as said member is indexed in one direction.

7. In a machine tool, a support, an indexible member carried by said support and provided with spaced abutment portions, a locking element reciprocably carried by said support and adapted to cooperate with one end of an abutment portion in each indexed position of said member, a locating element reciprocably carried by said support and cooperating with the opposite end of said abutment portion in each indexed position of said member and movable transversely to the path of movement of said locking element, pressure means moving said locating element in one direction; and actuating means for said locking and locating elements and including a part carried by said support for movement in opposite directions and located within the included angle defined by the paths of movement of said elements and extending substantially transversely to the path of movement of the locating element, operative connections between said part and said locking element for actuating the latter positively in either direction, and said part and said locating element being provided with cooperating portions acting upon movement of said part in one direction to positively move the locating element against the action of said pressure means and upon movement of the part in the opposite direction to control the movement of the locating element under the action of said pressure means.

8. In a machine tool, a support, an indexible member carried by said support and provided with spaced abutment portions, a locking element reciprocably carried by said support and adapted to cooperate with one end of an abutment portion in each indexed position of said member, an adjustable stop carried by said support and in longitudinal alignment with said locking element, a locating element reciprocably carried by said support and cooperating with the opposite end of said abutment portion and with said stop in each indexed position of said member and movable transversely to the path of movement of said locking element, pressure means moving said locating element in one direction; and actuating means for said locking and locating elements and including a part carried by said support for movement in opposite directions and located within the included angle defined by the paths of movement of said elements and extending substantially transversely to the path of movement of the locating element, operative connections between said part and said locking element for actuating the latter positively in either direction, and said part and said locating element being provided with cooperating portions acting upon movement of said part in one direction to positively move the locating element against the action of said pressure means and upon movement of the part in the opposite direction to control the movement of the locating element under the action of said pressure means.

9. In a machine tool as defined in claim 8 and wherein said locking element comprises interconnected portions that are relatively adjustable in a direction longitudinally of the locking element and toward and away from said stop.

10. In a machine tool, a support, an indexible member carried by said support and provided with spaced abutment portions, a locking element reciprocably carried by said support and adapted to cooperate with one end of an abutment portion in each indexed position of said member, a locating element reciprocably carried by said support and cooperating with the opposite end of said abutment portion in each indexed position of said member and movable transversely to the path of movement of said locking element, pressure means moving said locating element in one direction; and actuating means for said locking and locating elements and including a reciprocable part carried by said support and located within the included angle defined by the paths of movement of said elements and movable in a path substantially parallel to the path of movement of the locking element, operative connections between said part and said locking element for actuating the latter positively in either direction, said part and said locating element being provided with cooperating portions acting upon movement of said part in one direction to positively move the locating element against the action of said pressure means and upon movement of the part in the opposite direction to control the movement of the locating element under the action of said pressure means, an operating member movably carried by said support and extending in a direction substantially transversely to the paths of movement of said locking element and said part, and operative connections between said operating member and said part.

NICHOLAS P. DARASH.

REFERENCES CITED

The following references are of record in the file of this patent:

UNITED STATES PATENTS

| Number | Name | Date |
|---|---|---|
| 390,190 | Richards | Sept. 25, 1888 |
| 480,964 | Richards | Aug. 16, 1892 |
| 921,721 | Mellis | May 18, 1909 |
| 938,156 | Libby | Oct. 26, 1909 |
| 1,320,609 | Drissner et al | Nov. 4, 1919 |
| 1,930,035 | Bogart | Oct. 10, 1933 |
| 2,086,850 | Bullard | July 13, 1937 |
| 2,135,639 | Gorham | Nov. 8, 1938 |
| 2,273,844 | Drissner | Feb. 24, 1942 |
| 2,300,389 | Ruppel | Oct. 27, 1942 |

FOREIGN PATENTS

| Number | Country | Date |
|---|---|---|
| 392,816 | Great Britain | May 25, 1933 |
| 540,845 | Great Britain | Oct. 31, 1941 |